(12) United States Patent
Nakayama et al.

(10) Patent No.: US 7,201,659 B2
(45) Date of Patent: Apr. 10, 2007

(54) DATA DELIVERY SYSTEM, DATA DELIVERY SERVER AND VIDEO GAME DEVICE

(75) Inventors: Norio Nakayama, Osaka (JP); Kazuhiro Namba, Amagasaki (JP)

(73) Assignee: Konami Computer Entertainment Osaka, Inc., Osaka (JP)

( * ) Notice: Subject to any disclaimer, the term of this patent is extended or adjusted under 35 U.S.C. 154(b) by 641 days.

(21) Appl. No.: 10/165,098

(22) Filed: Jun. 6, 2002

(65) Prior Publication Data

US 2002/0187835 A1 Dec. 12, 2002

(30) Foreign Application Priority Data

Jun. 8, 2001 (JP) ............................ 2001-174561

(51) Int. Cl.
*G06F 19/00* (2006.01)
*G06F 7/04* (2006.01)
*H04L 9/00* (2006.01)

(52) U.S. Cl. ........................... 463/42; 463/40; 463/43; 726/3; 726/4; 726/7; 726/26; 726/29

(58) Field of Classification Search .................. 463/29, 463/40, 42–45, 47; 705/51, 55, 56; 725/6, 725/25, 26, 30, 133, 153; 902/4, 23; 380/251
See application file for complete search history.

(56) References Cited

U.S. PATENT DOCUMENTS

| 5,014,982 | A | * | 5/1991 | Okada et al. .................. 463/29 |
| 5,758,068 | A | * | 5/1998 | Brandt et al. .................. 726/27 |
| 5,778,068 | A | * | 7/1998 | Johnson et al. ............. 713/189 |
| 5,779,549 | A | * | 7/1998 | Walker et al. ................ 463/42 |
| 5,791,992 | A | * | 8/1998 | Crump et al. ................ 463/41 |
| 5,857,021 | A | * | 1/1999 | Kataoka et al. ............... 705/54 |
| 5,963,915 | A | * | 10/1999 | Kirsch .......................... 705/26 |
| 6,112,323 | A | * | 8/2000 | Meizlik et al. ............. 714/748 |
| 6,233,565 | B1 | * | 5/2001 | Lewis et al. .................. 705/35 |
| 6,233,567 | B1 | * | 5/2001 | Cohen .......................... 705/59 |
| 6,324,648 | B1 | * | 11/2001 | Grantges, Jr. ................ 726/12 |
| 6,327,609 | B1 | * | 12/2001 | Ludewig et al. ............ 709/203 |
| 6,327,628 | B1 | * | 12/2001 | Anuff et al. ................. 719/311 |
| 6,393,484 | B1 | * | 5/2002 | Massarani ................... 709/227 |

(Continued)

FOREIGN PATENT DOCUMENTS

EP 0 990 460 4/2000

(Continued)

*Primary Examiner*—Corbett B. Coburn
*Assistant Examiner*—William H McCulloch, Jr.
(74) *Attorney, Agent, or Firm*—Jordan and Hamburg LLP

(57) ABSTRACT

In a data delivery system utilizing a network 400, a data delivery server 100 receives a recording medium specifying information stored in a recording medium 300 from a video game device 200, generates and administers an authentication information and a password used to permit the delivery of an event information to the video game device 200 while relating them to the video game device 200, transmits the generated authentication information and password to the video game device 200, and delivers the event information to the video game device 200 upon receiving the password as a response from the video game device 200. The video game device 200 includes a password storage means for receiving the authentication information and the password from the data delivery server 100 and saving the password.

12 Claims, 8 Drawing Sheets

U.S. PATENT DOCUMENTS

| | | | |
|---|---|---|---|
| 6,434,535 B1* | 8/2002 | Kupka et al. | 705/24 |
| 6,606,707 B1* | 8/2003 | Hirota et al. | 713/172 |
| 6,641,481 B1* | 11/2003 | Mai et al. | 463/42 |
| 6,650,831 B1* | 11/2003 | Thompson | 396/6 |
| 6,659,861 B1* | 12/2003 | Faris et al. | 463/1 |
| 6,716,102 B2* | 4/2004 | Whitten et al. | 463/43 |
| 6,870,849 B1* | 3/2005 | Callon et al. | 370/395.32 |
| 6,928,329 B1* | 8/2005 | Giaimo et al. | 700/94 |
| 6,931,131 B1* | 8/2005 | Becker et al. | 380/258 |
| 6,956,833 B1* | 10/2005 | Yukie et al. | 370/328 |
| 7,082,532 B1* | 7/2006 | Vick et al. | 713/155 |
| 7,124,443 B2* | 10/2006 | Ishibashi et al. | 726/26 |
| 2001/0035814 A1* | 11/2001 | Uchida | 340/5.74 |
| 2002/0026590 A1* | 2/2002 | Kusunoki | 713/201 |
| 2002/0055386 A1* | 5/2002 | Yotsugi et al. | 463/42 |
| 2002/0066094 A1* | 5/2002 | Futakuchi | 717/172 |
| 2002/0068631 A1* | 6/2002 | Raverdy et al. | 463/42 |
| 2002/0087562 A1* | 7/2002 | McAnaney et al. | 707/100 |
| 2002/0120577 A1* | 8/2002 | Hans et al. | 705/59 |
| 2002/0143817 A1* | 10/2002 | Dutta et al. | 707/513 |
| 2002/0178366 A1* | 11/2002 | Ofir | 713/182 |
| 2002/0194076 A1* | 12/2002 | Williams et al. | 705/26 |
| 2003/0018559 A1* | 1/2003 | Chung et al. | 705/37 |
| 2003/0074354 A1* | 4/2003 | Lee et al. | 707/8 |

FOREIGN PATENT DOCUMENTS

| | | |
|---|---|---|
| EP | 1 078 667 | 2/2001 |
| JP | 2000-35885 | 2/2000 |
| JP | 2000-90148 | 3/2000 |
| JP | 2000-115097 | 4/2000 |
| JP | 2000-148845 | 5/2000 |
| JP | 2000-157724 | 6/2000 |
| JP | 2000-215211 | 8/2000 |
| JP | 2001-5786 | 1/2001 |
| WO | WO 00/61252 | 10/2000 |

* cited by examiner

DATA DELIVERY SYSTEM, DATA DELIVERY SERVER AND VIDEO GAME DEVICE

BACKGROUND OF THE INVENTION

1. Field of the Invention

The present invention relates to a technology of delivering an event information to a video game device via a network.

2. Description of the Related Art

In recent years, with the spread of the communication technology, a service of delivering various data such as movies, music and game programs (hereinafter, "event information") from a server to a terminal device (i.e., a personal computer and the like), a video game device or the like provided with a communication function via a network such as Internet has become available in addition to selling these data at shops.

In a data delivery system used to implement this service, a user ID, a password and the like are sent as information for authenticating whether or not a sender is a certified user from a terminal device provided with a communication function, etc. to a server for delivering data via a network. The server side compares the received user ID and password with already registered user ID and password to authenticate whether the sender is a certified user and then delivers various kinds of data.

However, the user ID and the password used to authenticate the certified user are generally alphanumeric character strings, and it is cumbersome for the user to input these character strings every time connection is made with the server via the network. Particularly, video game devices are suited to playing video games and the like as compared to terminal devices such as personal computers, but do not have a keyboard for enabling the usual input unlike the personal computers and the like. Thus, every time connection is made with the server, an input needs to be made on a monitor screen using a controller for the video game device, making it even more cumbersome to input the character strings.

SUMMARY OF THE INVENTION

In view of the problem residing in the prior art, an object of the present invention is to provide a data delivery system which can be highly conveniently used by users by eliminating a cumbersome input operation when receiving the delivery of an event information to a video game device.

In order to solve the above problems, according to this data delivery system, in the data delivery server, at least the recording medium specifying information stored in the recording medium and read by the video game device is received from the video game device, and the authentication information and the password used to permit the delivery of the event information to the video game are generated and administered based on the received recording medium specifying information while being related to the video game device. The authentication information and the password generated to deliver the event information in the data delivery server are transmitted to the video game device, and the event information is transmitted to the video game device upon the receipt of the password as a response from the video game device to which the authentication information and the password have been transmitted. On the other hand, the password received from the data delivery server to receive the delivery of the event information is saved in a memory or the like in the video game device.

In this data delivery system, the data delivery server provides the delivery of the event information to the video game device by generating and administering the authentication information (e.g. user ID) and the password used to permit the delivery of the event information based on the information specifying the recording medium (recording medium specifying information) while relating them to the video game device. Thus, the event information can be delivered after highly reliably authenticating the accessed user in response to the delivery request from the video game device. Further, in the data delivery system, a deliverer at the data delivery server side can provide the delivery of the event information corresponding to the recording medium since the data delivery server generates the authentication information (e.g. user ID) and the password used to permit the delivery of the event information based on the information specifying the recording medium (recording medium specifying information). On the other hand, since the video game device saves the password received from the data delivery server in a memory or the like in this data delivery system, the password is automatically read from the memory or the like and transmitted as a delivery request to the data delivery server in the case of trying to receive the delivery of the event information. Thus, the user can be freed from cumbersomeness to input an alphanumeric character string such as the password every time he tries to receive the delivery of the event information.

These and other objects, features and advantages of the present invention will become more apparent upon a reading of the following detailed description and accompanying drawings.

DETAILED DESCRIPTION OF THE PREFERRED EMBODIMENTS OF THE PRESENT INVENTION

Figure 1:
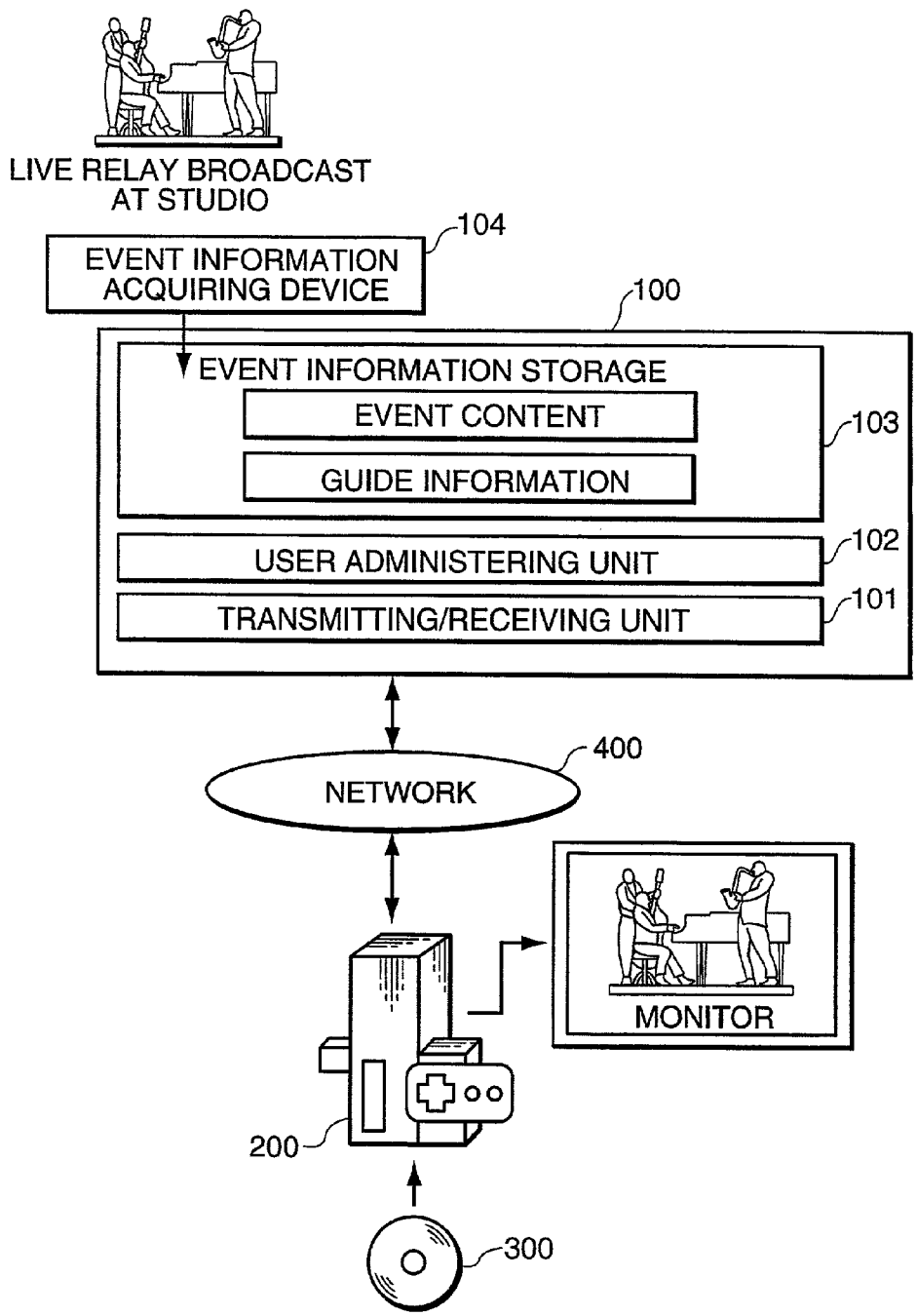
FIG. 1 is a schematic construction diagram of a data delivery system including a data delivery server and a video game device according to the invention.

Hereinafter, embodiments of the present invention are described while suitably referring to the accompanying drawings. FIG. 1 is a schematic construction diagram of a data delivery system including a data delivery server 100 and a video game device 200 according to the invention. This data delivery system is provided with a data delivery server 100 in which various pieces of event information are stored and which is connectable with the video game device 200 via a network 400 such as Internet. Upon receiving a request to deliver an event information from the video game device 200 via the network 400, this data delivery server 100 delivers the event information after authenticating whether or not the video game device 200 is a certified user by means of a password and the like. Although a modem and a main game unit of the video game device 200 are constructed into a single unit in an example of FIG. 1, the video game device 200 may be connected with the data delivery server 100 via a modem connected with the main game unit of the video game device 200 unless the main game unit of the video game device 200 has a communication function.

First, the data delivery server 100 is described. The data delivery server 100 is constructed as a server computer provided with a CPU, a storage means such as a memory or a hard disk device, and a function of enabling a data communication with an other equipment via a network such as Internet. Functionally, the data delivery server 100 is provided with a transmitting/receiving unit 101, a user administering unit 102, an event information storage 103, and an event information acquiring device 104.

The transmitting/receiving unit 101 carries out necessary operations at the time of receiving a user registration request and an event information delivery request from the video game device 200 and transmitting the event information to the video game device 200. Further, the transmitting/receiving unit 101 also transmits authentication information and a password generated by the user administering unit 102 to be described later to the video game device 200, and receives a selection instruction to select at least one of an event content and a guide information from the video game device 200. The transmitting/receiving unit 101 functions as a user registration request receiving means, an authentication information presenting means and a selection instruction receiving means and also functions as part of a delivering means.

The user administering unit 102 administers, for example, whether or not the delivery of the event information should be permitted based on, e.g. the validity of the password transmitted from the video game device 200 at the time of the user registration and an access. This user administering unit 102 has a function (authentication information administering means) of generating and administering the authentication information (user ID) and the password used to permit the delivery of the event information while relating them to the video game device 200 based on a recording medium ID received from the video game device 200. This user administering unit 102 also has a function (provisional registering means) of temporarily registering the password generated for the video game device 200 and a function (regular registering means) of registering the video game device 200 as a certified user upon receiving the above password from the video game device 200. This user administering unit 102 is further provided with a function (delivery condition administering means) of administering a delivery condition concerning the delivery of the event information while relating it to the authentication information (user ID). The delivery condition is administered by the user administering unit 102 while being related to the user ID and may be an amount of data to be delivered, the number of data deliveries, the number of data deliveries, a period of validity of the data delivery. The user administering unit 102 functions as part of the delivering means.

The event information storage 103 is adapted to store various pieces of event information to be delivered to the video game device 200. This storage 103 is constructed such that event contents and pieces of guide information can be stored. The event contents are contents to be delivered to the video game device 200 and comprised of, e.g. video music. The guide information is comprised of various pieces of information concerning the event contents. For example, if the event content is a live relay broadcast of a music performance at a studio, the guide information is comprised of a date of performance, a profile information of a player, and a sale information on related products and the like. It should be noted that the event information may include game software data.

The event information acquiring device 104 acquires various pieces of event information. For instance, the device 104 acquires a live relay broadcast at a studio as an event information by means of a video camera or the like.

Figure 2:
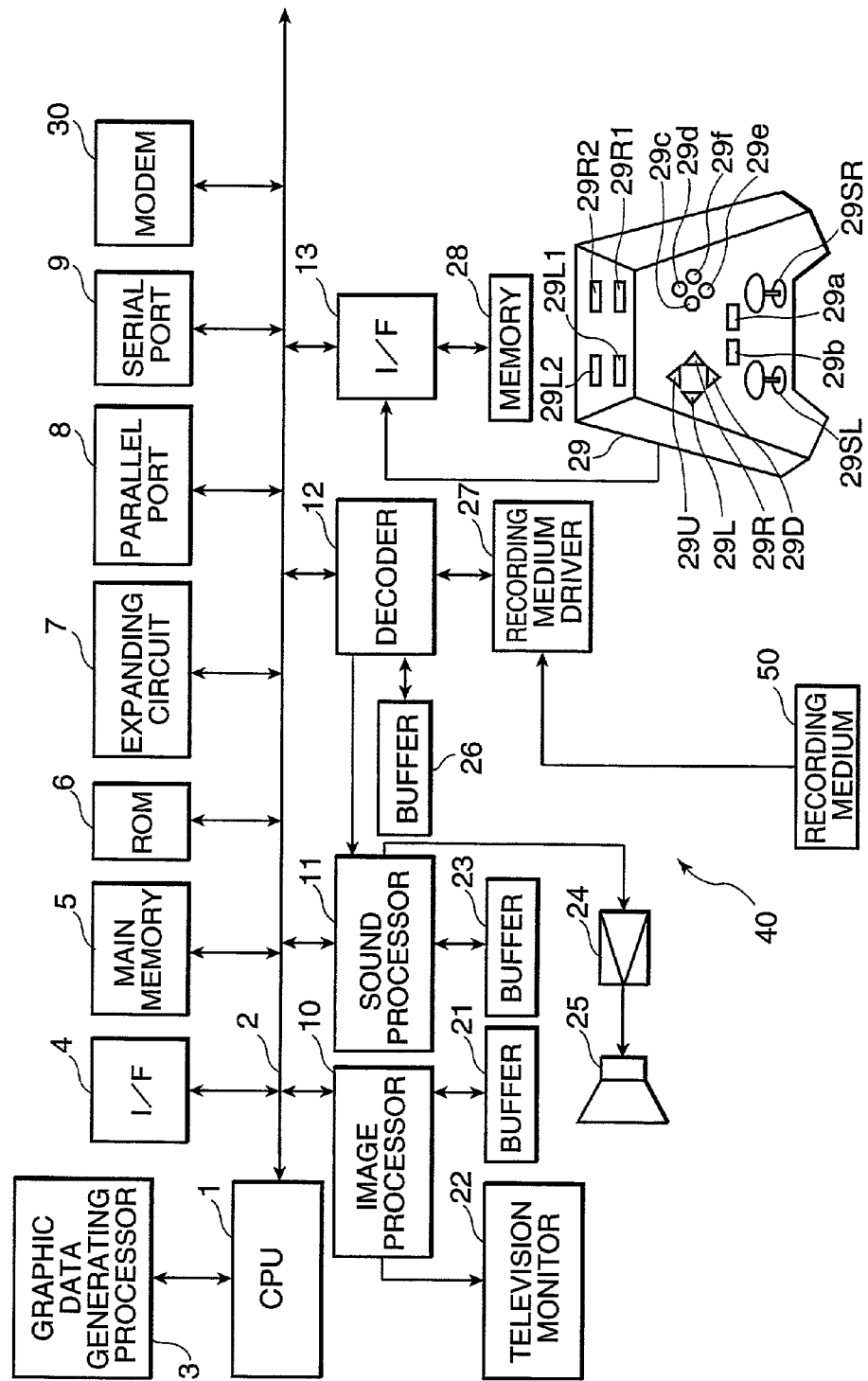
FIG. 2 is a block diagram showing an electrical construction of the video game device applied to the data delivery system according to one embodiment of the invention.

Next, the video game device 200 is described. FIG. 2 is a block diagram showing an electrical construction of the video game device 200 to which the data delivery system according to one embodiment of the present invention is applied. This video game device 200 is provided with a main game unit 40 and a recording medium 50 storing a program data. In this embodiment, the video game device 200 is further provided with a modem 30 for data communication with the data delivery server 100. The main game unit 40 is comprised of a CPU (central processing unit) 1, a bus line 2 connected with the CPU 1 and including an address bus, a data bus and a control bus, and a graphic data generating processor 3. The modem 30 functions as a user registration request transmitting means, authentication information receiving means and a delivery request transmitting means.

With the bus line 2 are connected an interface circuit 4, a main memory 5 including a RAM (random access memory), a ROM (read only memory) 6, an expanding circuit 7, a parallel port 8, a serial port 9, an image processor 10, a sound processor 11, a decoder 12 and an interface circuit 13.

A buffer 21 and a television monitor (hereinafter, merely "monitor") 22 are connected with the image processor 10; a buffer 23 is connected with the sound processor 11; and a loudspeaker 25 is connected with the sound processor 11 via an amplifying circuit 24. Further, a buffer 26 and a recording medium driver 27 are connected with the decoder 12; and a memory 28 and a controller 29 are connected with the interface circuit 13.

This video game device 200 takes different forms depending on its application. For example, if the video game device 200 is constructed for home use, the monitor 22 and the loudspeaker 25 are separate from the main game unit 40. On the other hand, if the video game device is used for business use, all the elements shown in FIG. 2 are accommodated as a unit in one casing.

In the case that the video game device 200 is constructed with a personal computer or a workstation as a core, the monitor 22 corresponds to a computer display, the image processor 10, the sound processor 11 and expanding circuit 7 correspond to part of the program data stored in the recording medium 50 or hardware on an extension board mounted on an extension slot of the computer, and the interface circuit 4, the parallel port 8, the serial port 9 and the interface circuit 13 correspond to hardware on the extension board mounted on the extension slot of the computer. Further, the buffers 21, 23, 26 correspond to the main memory 5 or the respective areas of an extension memory (not shown). A case where the video game device 200 is constructed for home use is described in this embodiment.

Next, the respective elements shown in FIG. 2 are described. The graphic data generating processor 3 plays a roll as a so-called co-processor of the CPU 1. Specifically, this processor 3 performs a coordinate transform and a light source calculation, e.g. calculation of fixed-point matrices and vectors by parallel processing. Main operations performed by the processor 3 include an operation of obtaining an address in a display area of an image to be processed based on a coordinate data of vertices in a two-dimensional (2D) or three-dimensional (3D) space of an image data supplied from the CPU 1, a movement amount data and a rotation amount data of this image data and returning the obtained address data to the CPU1, and an operation of calculating the luminance of an image according to a distance from a virtually set light source.

The interface circuit 4 is an interface for peripheral devices such as pointing devices including mousses and track balls. A program data as an operating system of the video game device 200 is stored in the ROM 6. In personal computers, this program data corresponds to a BIOS (basic input output system).

The expanding circuit 7 expands a compressed image compressed by intra-coding in accordance with the MPEG (moving picture engineering group) for moving images and JPEG (joint picture engineering group) for still images. The expansion may be one of inverse quantization process (decoding of a data encoded by VLC "variable length code"), an IDCT (inverse discrete cosine transform) process, or a restoration process of an intra-image.

The image processor 10 forms an image in the buffer 21 in accordance with an imaging command issued by the CPU 1 at intervals of a specified time T (one frame, e.g. T=1/60 sec.).

The buffer 21 includes, for example, a RAM and is comprised of a display area (frame buffer) and a non-display area. The display area is comprised of a development area of a data to be displayed on a display surface of the monitor 22. In this embodiment, the non-display area is comprised of storage areas for data defining skeletons, model data defining polygons, animation data used to animate models, pattern data representing contents of the respective animated movements, texture data and color palette data, etc.

Here, the texture data are 2D image data, and the color palette data are data for designating colors of the texture data and the like. These data are read from the CPU 1 and saved in the non-display area of the buffer 21 at once or a plurality of times in accordance with the progress of the game.

Imaging commands include those used to generate 3D images using polygons and those used to generate usual 2D images. Here, polygons are polygonal 2D virtual figures: triangular in this embodiment.

The image command used to generate a 3D image using the polygons includes a polygon vertex address data in the display area of the buffer 21, a texture address data representing the saved positions of the texture data to be adhered to the polygons in the buffer 21, a color palette address data representing the saved positions of the color palette indicating the colors of the texture data in the buffer 21, and a luminance data representing the luminance of the textures.

Among these data, the polygon vertex address data in the display area are polygon vertex coordinate data in the 2D space obtained by applying a coordinate transform to polygon vertex coordinate data in the 3D space from the CPU 1 based on a movement amount data and a rotation amount data of a screen itself by means of the graphic data generating processor 3. Further, the luminance data are determined based on distances between the positions represented by the polygon vertex coordinate data after the coordinate transform sent from the CPU 1 and a virtually arranged light source by means of the graphic data generating processor 3.

The polygon vertex address data represent addresses in the display area of the buffer 21, and the image processor 10 writes a texture data corresponding to a range of the display area of the buffer 21 defined by three polygon vertex address data.

One object is formed by a multitude of polygons. The CPU 1 stores the coordinate data of the respective polygons in the 3D space in the buffer 21 in relation to vector data of the corresponding skeletons. The following processing is performed in the case that a character is moved on the display surface by operating the controller 29, i.e. a movement of the character itself is expressed or a point of viewing the character is changed.

Specifically, the CPU 1 feeds the 3D coordinate data of the vertices of the respective polygons held in the non-display area of the buffer 21 and the movement amount data and the rotation amount data of the respective polygons, which were obtained from the coordinates and the rotation amount data of the skeletons, to the graphic data generating processor 3.

The graphic data generating processor 3 successively calculates the 3D coordinate data of the respective polygons after the movement and rotation based on the 3D coordinate data of the vertices of the respective polygons and the movement amount data and the rotation amount data of the respective polygons.

Among the thus obtained 3D coordinate data of the respective polygons, those in horizontal and vertical directions are fed to the image processor 10 as the address data in the display area of the buffer 21, i.e. as the polygon vertex address data.

The image processor 10 writes a texture data represented by the texture address data allotted in advance in the triangular display area of the buffer 21 defined by three polygon vertex address data. In this way, an object formed by adhering the texture data to a multitude of polygons is displayed on the display surface of the monitor 22.

The imaging command for generating a usual 2D image is comprised of vertex address data, texture address data, color palette address data representing stored positions of the color palette data indicating the color of the texture data in the buffer 21, and luminance data representing the luminance of the textures. Among these data, the vertex address data are coordinate data obtained by applying a coordinate transform to vertex coordinate data in the 2D space from the CPU 1 based on a movement amount data and a rotation amount data from the CPU 1 by means of the graphic data generating processor 3.

The sound processor 11 writes an ADPCM (Adaptive Differential Pulse Code Modulation) data read from the recording medium 50 in the buffer 23 to use the ADPCM data stored in the buffer 23 as a sound source. The sound processor 11 reads the ADPCM data based on a clock signal having a frequency of, e.g. 44.1 kHz.

The sound processor 11 applies various processings such as pitch conversion, addition of noise, envelope setting, level setting, addition of reverb to the ADPCM data read from the buffer 23.

If the sound data read from the recording medium 50 is a PCM data such as a compact disk digital audio (CD-DA) data, the read sound data is converted into the ADPCM data by the sound processor 11.

Further, processing of the PCM data by the program data is directly performed in the main memory 5. The PCM data processed in the main memory 5 is fed to the sound processor 11 and converted into an ADPCM data and then is outputted as a sound from the loudspeaker 25 after the aforementioned various processings are applied thereto.

The recording medium driver 27 is, for example, a CD-ROM drive, a hard disk driver, an optical disk drive, a flexible disk drive, a silicone disk drive, or a cassette medium reader.

The recording medium 50 is, for example, a DVD-ROM, a CD-ROM, a hard disk, an optical disk, a flexible disk or a semiconductor memory. It should be noted that the recording medium 50 functions as a password storage means for storing the password received from the data delivery service 1.

The recording medium driver 27 reads the images, sounds and program data from the recording medium 50 and feeds the read data to the decoder 12. The decoder 12 applies error correction using an error correction code (ECC) to the reproduced data from the recording medium driver 27, and feeds the resulting data to the main memory 5 or the sound processor 11.

The memory 28 is, for example, a holder or a card type memory. The card type memory is adapted to hold various game parameters so as to hold a state, for example, when the game is interrupted midways. It should be noted that the memory 28 functions as a password storage means for storing the password received from the data delivery service 1.

The controller 29 is an operation means operable from the outside, is provided with a first left button 29L1, a second left button 29L2, a first right button 29R1, a second right button 29R2, an up-key 29U, a down-key 29D, a left-key 29L, a right-key 29R, a start button 29a, a select button 29b, a first button 29c, a second button 29d, a third button 29e, a fourth button 29f, a left stick 29SL and a right stick 29SR, and is adapted to send an operation signal corresponding to the operation of a game player to the CPU 1. It should be noted that the controller 29 has a function of receiving an input of the password received from the data delivery server 100 (input receiving means) in the video game device 200.

The up-key 29U, the down-key 29D, the left-key 29L and the right-key 29R are used by the game player to give commands to move, for example, a character or a cursor to up, down, left and right on the screen of the monitor 22 to the CPU 1.

The start button 29a is operated by the game player to instruct the start of the game program data loaded from the recording medium 50 to the CPU 1. The select button 29b is operated by the game player to instruct various selections concerning the game program data to be loaded in the main memory 5 from the recording medium 50 to the CPU 1.

The respective buttons and keys of the controller 29 except the left stick 29SL and the right stick 29SR are on-off switches which are turned on from their neutral positions by a pressing force from the outside and returned to the neutral positions upon being freed from the pressing force.

The left and right sticks 29SL, 29SR are stick-shaped controllers having substantially the same construction as a so-called joystick. Specifically, the controller 29 has a standing stick, which can be inclined to front, back, left, right or in any direction in a 360° range about a specified point of the stick as a supporting point. According to the direction and angle of inclination of the stick, an X-coordinate along transverse direction and a Y-coordinate along forward/backward direction in coordinate systems having the standing position of the stick as an origin are sent as an operation signal to the CPU 1 via the interface circuit 13.

The functions of the first left button 29L1, the second left button 29L2, the first right button 29R1 and the second right button 29R2 differ depending on the game program data to be loaded from the recording medium 50.

Next, the operation of this video game device 200 is summarily described. A power switch (not shown) is turned on to apply a power to the video game device 200. At this time, if the recording medium 50 is mounted in the recording medium driver 27, the CPU 1 instructs the recording medium driver 27 to read the program data from the recording medium 50 in accordance with the operating system stored in the ROM 6. In response to this instruction, the recording medium driver 27 reads the images, sounds and program data from the recording medium 50. The read images, sounds and program data are fed to the decoder 12, where error correction is applied thereto.

The image data to which error correction was applied in the decoder 12 are fed via the bus line 2 to the expanding circuit 7, where the aforementioned expansion is applied thereto. The resulting image data are fed to the image processor 10, which in turn writes them in the non-display area of the buffer 21.

The sound data to which error correction was applied in the decoder 12 are either written in the main memory 5 or fed to the sound processor 11 to be written in the buffer 23.

The program data to which error correction was applied in the decoder 12 are written in the main memory 5. Hereafter, the CPU 1 executes the game in accordance with the game program data stored in the main memory 5 and contents of instructions given by the game player via the controller 29. In other words, the controller 29 suitably controls image processing, sound processing and internal processing based on the contents of instructions given by the game player via the controller 29.

In this embodiment, the control for the image processing includes, for example, calculation of the coordinates of the respective skeletons and calculation of the vertex coordinate data of the respective polygons based on a pattern data corresponding to an animation instructed for the character, feed of the obtained 3D coordinate data and a viewing point data to the graphic data generating processor 3, issuance of the imaging commands including the address data in the display area of the buffer 21 and the luminance data calculated by the graphic data generating processor 3. The control for the sound processing includes, for example, issuance of sound output commands to the sound processor 11 and designation of levels, reverbs, etc. The control for the internal processing includes, for example, calculation according to the operation of the controller 29.

The image data having been performed an error correction process at the decoder 12 are supplied to an expansion circuit 7 where the error corrected data is expanded and supplied to the image processor 10. Then the data is written into the non-display area of the buffer 21.

In addition, the sound data having been performed an error correction process is either written into a main memory 5 or supplied to the sound processor 11 to be written into the buffer 23.

Furthermore, the program data having been performed an error correction process at the decoder 12 is written into the main memory 5. Thereafter, CPU 1 proceeds a game according to the game program data stored in the main memory 5 and the instructions given by a player through the controller 29. In other words, CPU 1 controls image processing, sound processing, and internal processing in accordance with the instruction contents given by the player through the controller 29.

Next, a recording medium 300 (corresponding to the recording medium 50 in FIG. 2) used in the data delivery system is described. In the readable recording medium 300 comprised of, e.g. a CD-ROM are stored data necessary for the video game device 200 to conduct a communication to receive the delivered event information from the data delivery server 100, for example, a communication program. A user purchases this recording medium 300 from a company engaged in the delivery of the event information using the data delivery server 100. The communication program stored in the recording medium 300 can be installed in the video game device 200 when a user receives a password from the data delivery server 100 and inputs it in the video game device 200 by means of the controller 29 to cancel a protection. This password is sent as information peculiar to the user when the user accesses the data delivery server 100 via the video game device 200, and the data delivery server 100 judges whether the accessed user is permitted to receive a data delivery based on the received password. If the user desires to obtain a new password, he obtains another recording medium. The communication program stored in the recording medium 300 is saved, for example, in the recording medium 300 beforehand in the video game device 200, transferred from the recording medium 300 to the main memory 5, and implemented by the CPU 1 based on the program data saved in the main memory 5.

Figure 3:
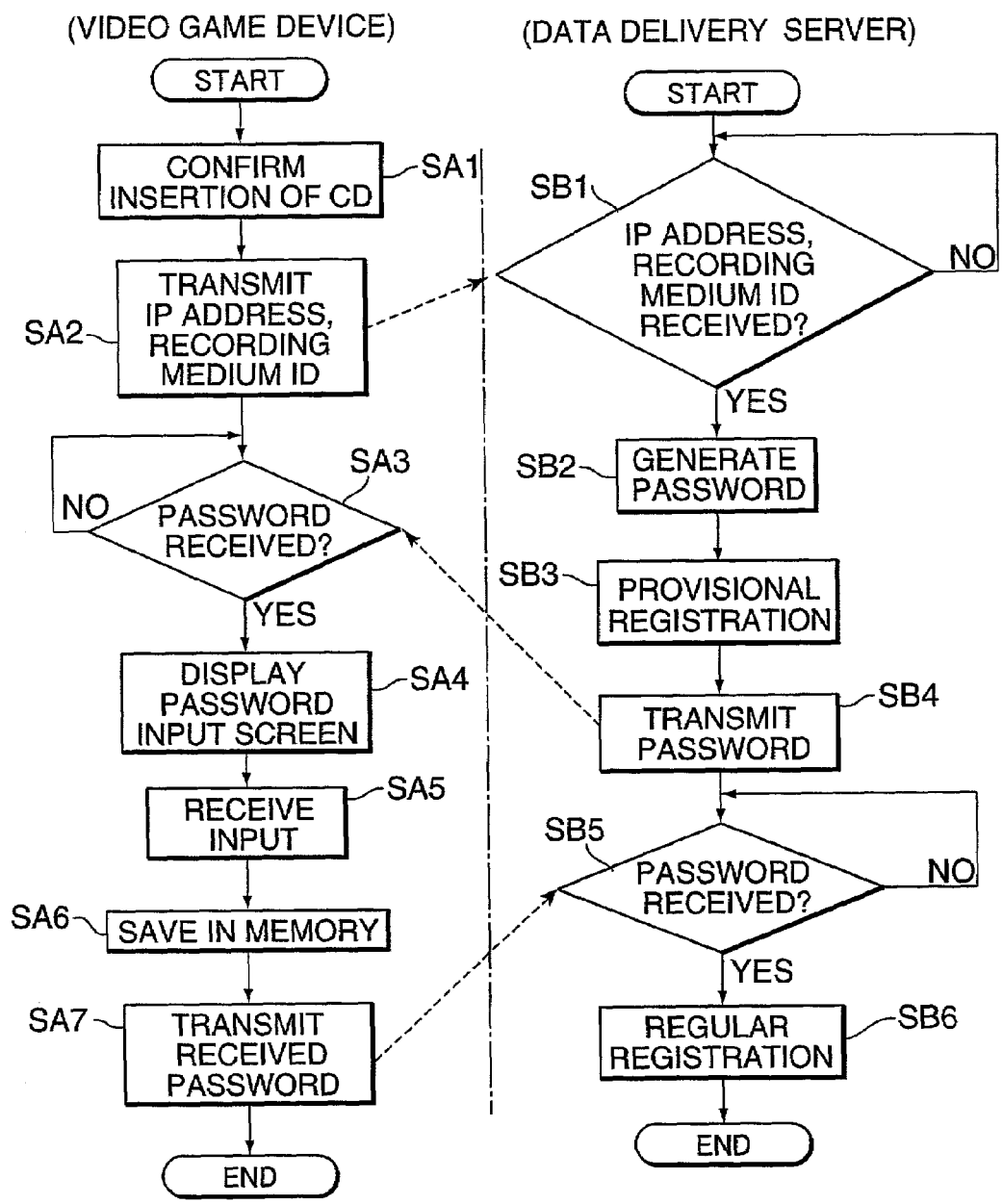
FIG. 3 is a flow chart showing an exemplary procedure of operations performed to register a user.

Next, a procedure of the user registration in the data delivery system is described. FIG. 3 is a flow chart showing an exemplary procedure of operations performed to register a user in order to receive a delivery of the event information in this system, wherein (A) left-hand side is a procedure of operations performed by the video game device 200 in accordance with the operations of the user, and (B) right-hand side is a procedure of operations performed by the data delivery server 100. In the description relating to FIGS. 3 to 5 including FIGS. 4 and 5 to be described later, the operation procedure in the video game device 200 and the one in the data delivery server 100 are suitably referred to in order to facilitate the description.

When the video game device 200 confirms that the user has inserted the recording medium 50 (corresponding to the recording medium 300 in FIG. 1) such as a CD-ROM into the recording medium driver 27 (Step SA1), the CPU 1 reads the communication program stored in the recording medium 50 for delivering the event information. The CPU 1 reads the identification information (recording medium ID) and an IP address of the video game device 200 in accordance with this communication program, and causes the modem 30 to transmit the read identification information and IP address to the data delivery server 100 via the network 400 (Step SA2).

The data delivery server 100 waits on standby until the transmitting/receiving unit 101 receives the identification information of the recording medium 50 and the IP address of the video game device 200 (NO in Step SB1). When the transmitting/receiving unit 101 receives the identification information of the recording medium 50 and the IP address of the video game device 200 (YES in Step SB1), the data delivery server 100 causes the user administering unit 102 to generate a user ID and a password for identifying the user based on the identification information of the recording medium 50 and the IP address of the video game device 200 (Step SB2) and to temporarily register the user ID and the password (Step SB3). Further, the data delivery server 100 causes the transmitting/receiving unit 101 to transmit this password to the video game device 200 (Step SB4).

The video game device 200 waits on standby until receiving the password from the data delivery server 100 via the modem 30 (NO in Step SA3). Upon receiving the password from the data delivery server 100 via the modem 30 (YES in Step SA3), the video game device 200 causes the CPU 1 to display the received password and an input screen (Step SA4), thereby urging the user to input the password. Upon receiving an input of the password made by the user through an instruction given from the controller 29 (Step SA5), the CPU 1 transmits the inputted password to the data delivery server 100 via the modem 30 (Step SA6). Then, the CPU 1 saves this password in the memory 28 (Step SA7). The memory for saving the password may be built in the main game unit 40 of the video game device 200 or may be an external memory mountable into the video game device 200.

The data delivery server 100 waits on standby until the transmitting/receiving unit 101 receives the inputted password from the video game device 200 (NO in Step SB5). When the transmitting/receiving unit 101 receives the inputted password from the video game device 200 (YES in Step SB5), the data delivery server 100 causes the user administering unit 102 to compare the password being administered and the received password and to regularly register this password and the user ID (Step SB6).

According to the above procedures, if the user registration is made at the time of the first access to store the password in the memory or the like, the user can receive the delivery of the event information from the data delivery server without performing a cumbersome input operation through the controller of the video game device 200 and the like when the next and succeeding accesses are to be made. Thus, the user can more conveniently use the data delivery system.

Since the user ID and the password are transmitted from the data delivery server 100, the user can be identified at the same time an input of the password is urged at the time of the user registration.

The authentication information of the certified user used to permit the delivery of the event information is comprised of the recording medium specifying information stored in the recording medium and the identification information peculiar to the video game device (e.g. the IP address of the video game device), uncertified use can be prevented by authentication based on these pieces of information.

The password generated to permit the delivery of the event information is temporarily provisionally registered and regular registration is made as the certified user upon the receipt of the password as a response from the video game device to which the event information is to be delivered. Thus, regular user registration can be made after confirming the intention of the user to make a user registration.

Further, if the video game device has a function of executing various programs stored in the recording medium mounted therein, the inventive system is applicable and, therefore, it is not necessary to purchase a new equipment and the like to authenticate whether or not the accessed user is a certified user.

Figure 4:
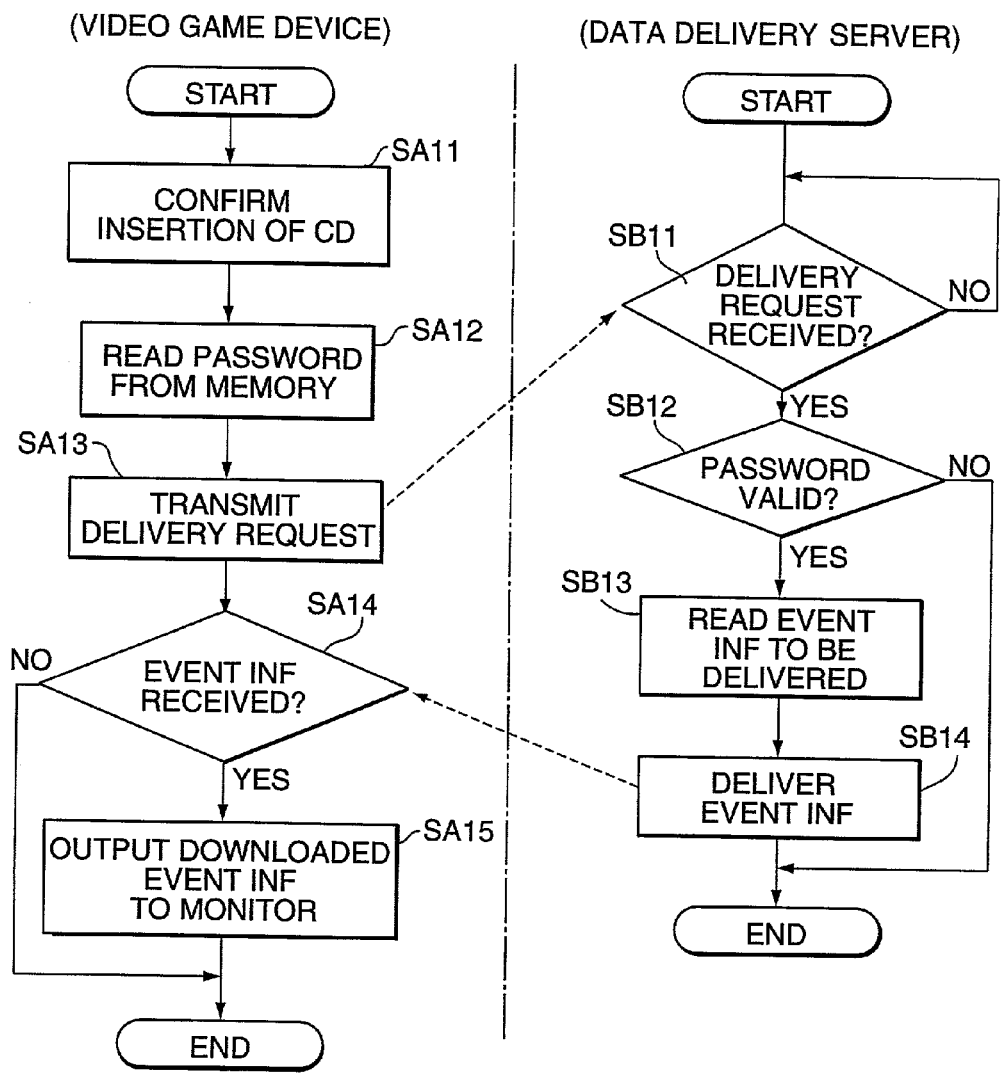
FIG. 4 is a flow chart showing an exemplary procedure of operations from the authentication of a certified user to the delivery of event information.

Next, a procedure of operations performed until the user receives the delivery of the event information after the user registration is described. FIG. 4 is a flow chart showing an exemplary procedure of operations performed until the event information is delivered after the authentication of the certified user, wherein (A) left-hand side is a procedure of operations performed by the video game device 200 in accordance with the operations of the user, and (B) right-hand side is a procedure of operations performed by the data delivery server 100.

When the video game device 200 confirms that the user has inserted the recording medium 50 such as a CD-ROM into the recording medium driver 27 (Step SA11), the CPU 1 reads the communication program stored in the recording medium 50 for delivering the event information. The CPU 1 reads the password used to receive the delivery of the event information from the memory 28 in accordance with this communication program (Step SA12), and transmits the read password as a delivery request to the data delivery server 100 (Step SA13).

The data delivery server 100 waits on standby until the transmitting/receiving unit 101 receives the delivery request including the password from the video game device 200 (NO in Step SB11). When the transmitting/receiving unit 101 receives the delivery request including the password from the video game device 200 (YES in Step SB11), the data delivery server 100 causes the user administering unit 102 to compare the password being administered and the received password, and reads an event information corresponding to the password from the event information storage 103 (Step SB13) if the received password is valid (YES in Step SB12). If the received password is invalid (NO in Step SB12), the series of operations performed by the data delivery server 100 are completed. In this case, the data delivery server 100 may cause the transmitting/receiving unit 101 to transmit a screen image indicating that the password is invalid to the video game device 200. The data delivery server 100 causes the transmitting/receiving unit 101 to transmit the read event information to the video game device 200 (Step SB14). The data delivery server 100 also judges the validity of the password based on the delivery condition administered by the user administering unit 102.

Upon receiving the event information corresponding to the password from the data delivery server 100 via the modem 30 (YES in Step SA14), the video game device 200 causes the CPU 1 to output the received event information to the television monitor 22 while downloading it (Step SA15). Unless receiving the event information (NO in Step SA14), the video game device 200 completes the series of operations performed thereby.

Figure 5:
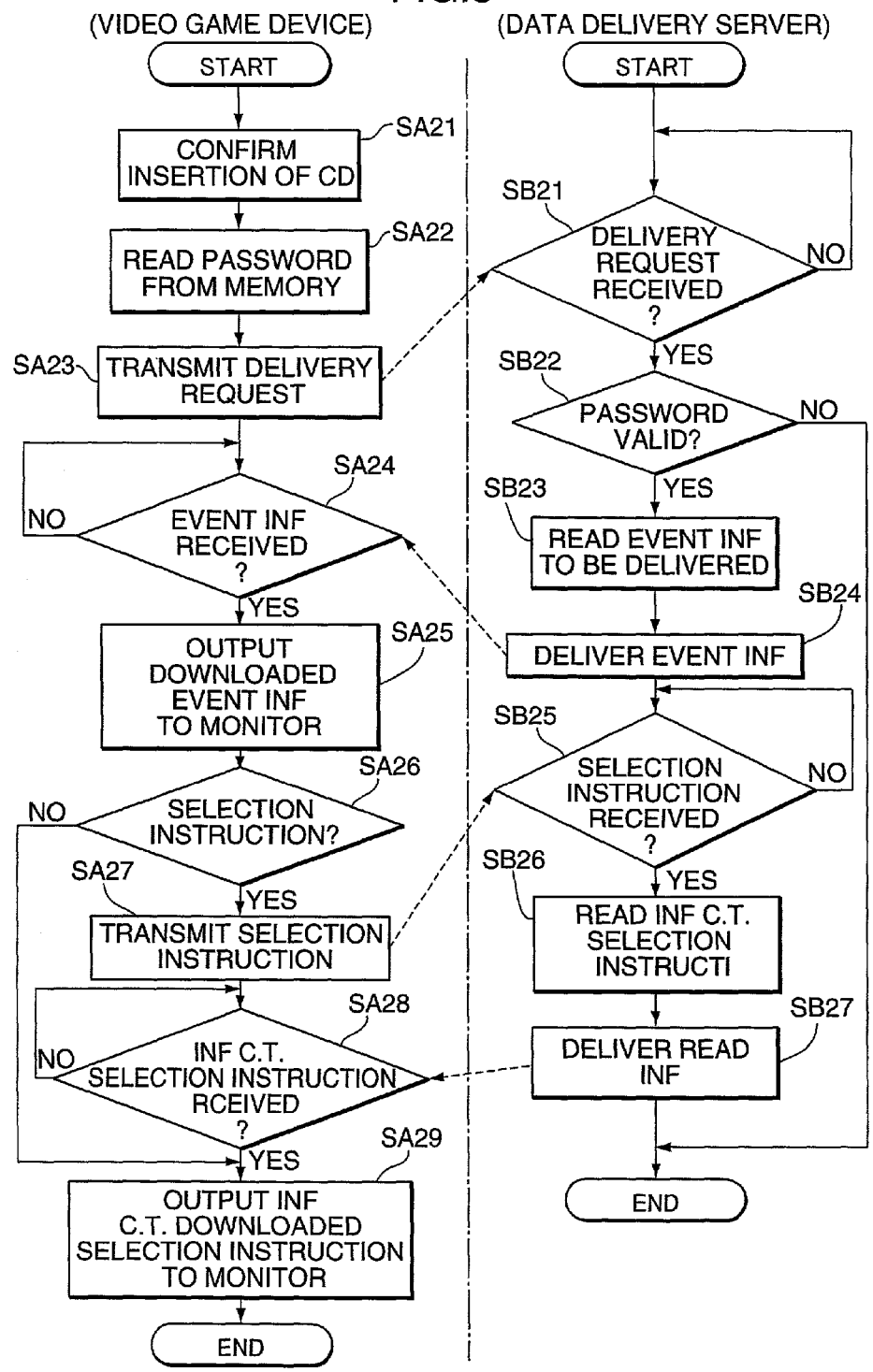
FIG. 5 is a flow chart showing another exemplary procedure of operations from the authentication of a certified user to the delivery of event information.

Next, a procedure of receiving the delivery of a live relay broadcast of a music performance, e.g. at a studio (event content) and information (guide information) concerning the music performance is described. FIG. 5 is a flow chart showing an exemplary procedure of operations performed until the event content and the guide information are delivered after the authentication of the certified user, wherein (A) left-hand side is a procedure of operations performed by the video game device 200 in accordance with the operations of the user, and (B) right-hand side is a procedure of operations performed by the data delivery server 100.

When the video game device 200 confirms that the user has inserted the recording medium 50 such as a CD-ROM into the recording medium driver 27 (Step SA21), the CPU 1 reads the communication program stored in the recording medium 50 for delivering the event information. The CPU 1 reads the password used to receive the delivery of the event information from the memory 28 in accordance with this communication program (Step SA22), and transmits the read password as a delivery request to the data delivery server 100 (Step SA23).

The data delivery server 100 waits on standby until the transmitting/receiving unit 101 receives the delivery request including the password from the video game device 200 (NO in Step SB21). When the transmitting/receiving unit 101 receives the delivery request including the password from the video game device 200 (YES in Step SB21), the data delivery server 100 causes the user administering unit 102 to compare the password being administered and the received password, and reads an event information corresponding to the password from the event information storage 103 (Step SB23) if the received password is valid (YES in Step SB22). If the received password is invalid (NO in Step SB22), the series of operations performed by the data delivery server 100 are completed. In this case, the data delivery server 100 may causes the transmitting/receiving unit 101 to transmit a screen image indicating that the password is invalid to the video game device 200. The data delivery server 100 causes the transmitting/receiving unit 101 to transmit the read event information to the video game device 200 (Step SB24).

Figure 6:
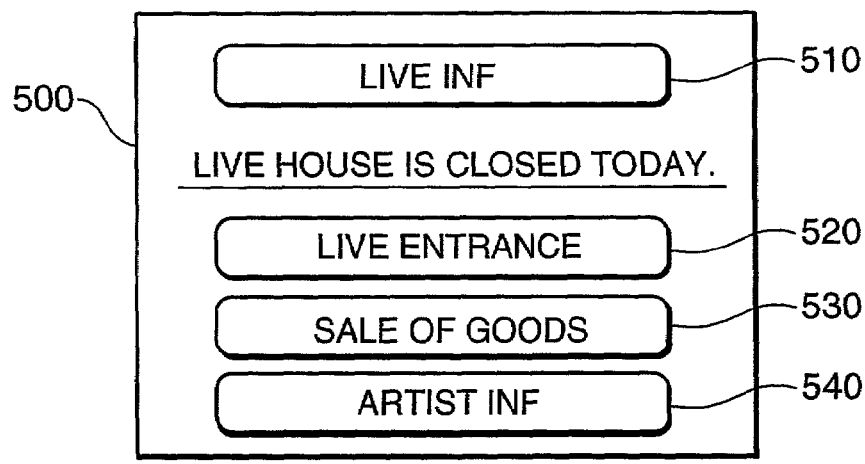
FIG. 6 is a diagram showing an example of a screen displaying received event information in the video game device.
Figure 7:
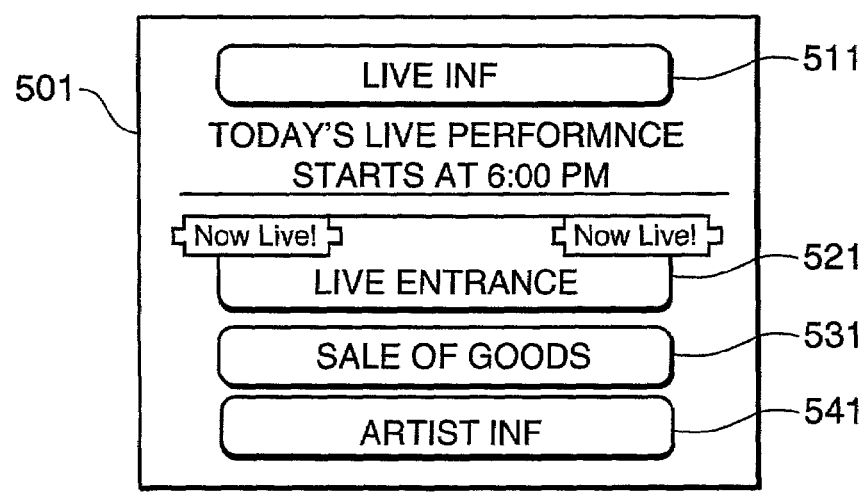
FIG. 7 is a diagram showing another example of the screen displaying received event information in the video game device.

Upon receiving the event information corresponding to the password from the data delivery server 100 via the modem 30 (YES in Step SA24), the video game device 200 causes the CPU 1 to output the received event information to the television monitor 22 while downloading it (Step SA25). Unless receiving the event information (NO in Step SA24), the video game device 200 waits on standby until receiving the event information. Here, the event information first received by the video game device 200 is a menu screen comprised of specified items concerning the music performance, e.g. at the studio. FIGS. 6 and 7 are diagrams showing examples of the menu screen.

In FIG. 6, a menu screen 500 is comprised of specified selection items (selecting sections): selection items of "Live Information" 510, "Live Entrance" 520, "Sale of Goods" 530, "Artist Information" 540 are displayed on the screen. As shown in the menu screen 500, the inspection of the selection items of "Live Information" 510, "Live Entrance" 520, "Sale of Goods" 530, "Artist Information" 540 (guide information) can be urged by displaying whether or not the delivery of the performance live relay broadcast is to be made.

Similar to FIG. 6, a menu screen 501 of FIG. 7 is also comprised of specified selection items: "Live Information" 511, "Live Entrance" 521, "Sale of Goods" 531, "Artist Information" 541 are displayed on the screen. Thus, the user can more conveniently use the data delivery system by making such a display to the user that the performance is being presently made in the item of the "Live Entrance" 521 or displaying the opening time and the like of the performance live relay broadcast as shown in the menu screen 501.

Figure 8:
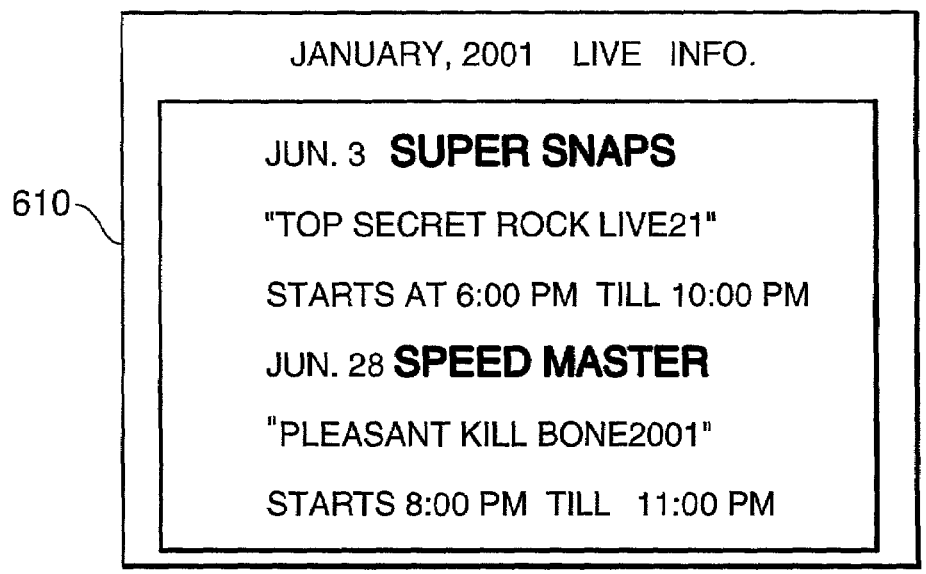
FIG. 8 is a diagram showing still another example of the screen displaying received event information in the video game device.
Figure 9:
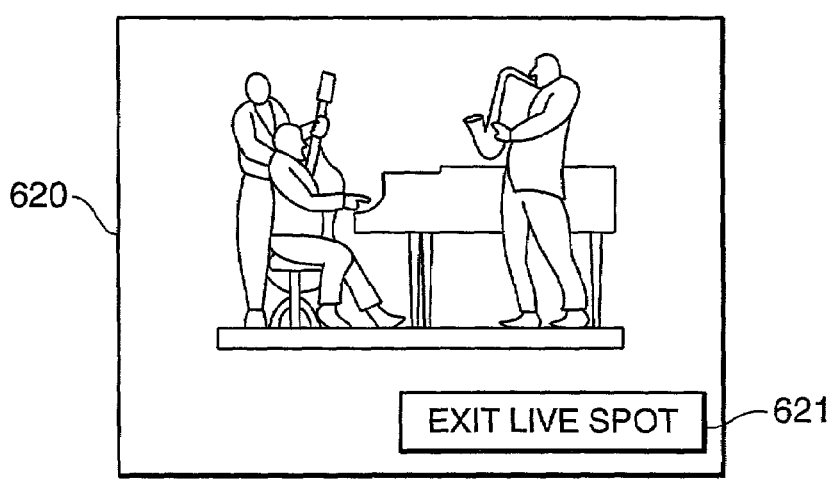
FIG. 9 is a diagram showing further another example of the screen displaying received event information in the video game device.

In FIGS. 6 and 7, the items of "Live Information" 510, 511, "Live Entrance" 520, 521, "Sale of Goods" 530, 531, and "Artist Information" 540, 541 are displayed on the screen. If "Live Information" 510, 511 is clicked by means of the controller 29, a live information screen 610 is displayed as a guide information as shown in FIG. 8. If "Live Entrance" 520, 521 is clicked by means of the controller 29, a live relay broadcast screen 620 is displayed as an event content as shown in FIG. 9. If "Live Entrance" 521 is clicked in the menu screen 501, a message saying that there is no live relay broadcast may be displayed since the live relay broadcast screen 620 is not displayed. If "Exist Live Spot"

Figure 10:
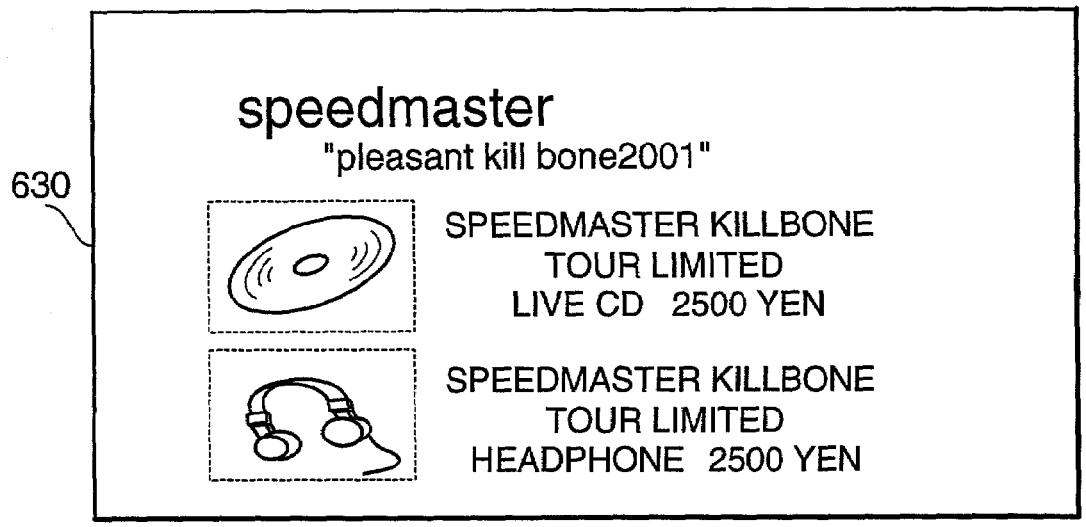
FIG. 10 is a diagram showing still another example of the screen displaying a received event information in the video game device.
Figure 11:
FIG. 11 is a diagram showing further another example of the screen displaying received event information in the video game device.

621 on the screen 620 is clicked, the menu screen comes up again. If "Sale of Goods" 530, 531 is clicked by means of the controller 29, a goods sale screen 630 related to the event content is displayed as a guide information as shown in FIG. 10. Further, if "Artist Information" 540, 541 is clicked by means of the controller 29, a screen 640 indicating latest information about the artist is displayed as a guide information as shown in FIG. 11.

When the CPU 1 receives an input of selection instruction of a desired item made by the operation of the user in accordance with an instruction from the controller 29 in the video game device 200 (YES in Step SA26), the CPU 1 transmits the received selection instruction to the data delivery server 100 via the modem 30 (Step SA27). Unless receiving the input of the selection instruction (NO in Step SA26), the video game device 200 completes the series of operations performed thereby. The above selection instructions of the desired items correspond to the "Live Information" 510, 511, "Live Entrance" 520, 521, "Sale of Goods" 530, 531, and "Artist Information" 540, 541 displayed on the menu screens 500, 501 shown in FIGS. 6 and 7.

The data delivery server 100 waits on standby until the transmitting/receiving unit 101 receives the selection instruction from the video game device 200 (NO in Step SB25). When the transmitting/receiving unit 101 receives the selection instruction from the video game device 200 (YES in Step SB25), the data delivery server 100 reads at least one of the event content and the guide information corresponding to the selection instruction (Step SB26). The data delivery server 100 completes the series of operations after causing the transmitting/receiving unit 101 to deliver at least one of the read event content and guide information to the video game device 200 (Step SB27).

Upon receiving at least one of the event content and the guide information corresponding to the selection instruction via the modem 30, the video game device 200 causes the CPU 1 to output the received at least one of the event content and the guide information to the television monitor 22 while downloading it (Step SA25). Unless receiving the at least one of the event content and the guide information (NO in Step SA28), the video game device 100 waits on standby until receiving the event information.

In the procedure described with reference to FIGS. 4 and 5, if the user registration is made at the time of the first access to store the password in the memory or the like, the user can receive the delivery of the event information from the data delivery server without performing a cumbersome input operation through the controller 29 of the video game device 200 and the like when the next and succeeding accesses are to be made. Thus, the delivery of the event information having a high convenience can be provided.

Further, a deliverer at the data delivery server side can provide a delivery service of the event information conforming to the amount of sales of the recording media by administering the validity terms and the like of the passwords for the respective users.

Furthermore, the deliverer at the data delivery server side can provide the user with the delivery of the event information corresponding to the sold price of the recording medium, and a delivery service providing period and the like can be set for each recording medium based on the data to be delivered.

Further, the guide information concerning the content information can be provided in addition to the event content desired by the user. If the event content is, for example, a video music, related information can also be obtained. For instance, while receiving the delivery of a live relay broadcast at a studio as event content, the user can receive the delivery of the date of the live relay broadcast, related goods information, and latest information of an artist as a guide information.

Furthermore, since the user can arbitrarily select the delivery of at least one of the event content and the guide information, the user can more conveniently use the date delivery system.

Further, since the delivery service of the specified data can be easily provided to the user via the network even without distributing recording media storing a game software and the like as the event information to the user, latest information and the like can be quickly provided to the video game device.

Furthermore, since a television receiver (television monitor) available at home as a display device can be used as the video game device, it is suitable to receive the delivery of a video music and the like (event information).

In summary, according to this data delivery system of the present invention, in the data delivery server, at least the recording medium specifying information stored in the recording medium and read by the video game device is received from the video game device, and the authentication information and the password used to permit the delivery of the event information to the video game are generated and administered based on the received recording medium specifying information while being related to the video game device. The authentication information and the password generated to deliver the event information in the data delivery server are transmitted to the video game device, and the event information is transmitted to the video game device upon the receipt of the password as a response from the video game device to which the authentication information and the password have been transmitted. On the other hand, the password received from the data delivery server to receive the delivery of the event information is saved in a memory or the like in the video game device.

In this data delivery system, the data delivery server provides the delivery of the event information to the video game device by generating and administering the authentication information (e.g. user ID) and the password used to permit the deliver of the event information based on the information specifying the recording medium (recording medium specifying information) while relating them to the video game device. Thus, the event information can be delivered after highly reliably authenticating the accessed user in response to the delivery request from the video game device. Further, in the data delivery system, a deliverer at the data delivery server side can provide the delivery of the event information corresponding to the recording medium since the data delivery server generates the authentication information (e.g. user ID) and the password used to permit the delivery of the event information based on the information specifying the recording medium (recording medium specifying information). On the other hand, since the video game device saves the password received from the data delivery server in a memory or the like in this data delivery system, the password is automatically read from the memory or the like and transmitted as a delivery request to the data delivery server in the case of trying to receive the delivery of the event information. Thus, the user can be freed from cumbersomeness to input an alphanumeric character string such as the password every time he tries to receive the delivery of the event information. Accordingly, the delivery of the event information can be provided to the video game device by generating and administering the authentication information and the password used to permit the delivery of the event information based on the information specifying the recording medium (recording medium specifying information) while relating them to the video game device to which the event information is to be delivered. Thus, the event information can be delivered after highly reliably authenticating the accessed user in response to the delivery request from the video game device. Further, the deliverer at the data delivery server side can provide the delivery of the event information corresponding to the recording medium and can securely charge for the delivery through the sale of the recording medium, etc. since the authentication information and the password used to permit the delivery of the event information are generated based on the information specifying the recording medium. Further, in the case of trying to receive the delivery of the event information using the video game device, the password is automatically read from the memory or the like and transmitted as a delivery request to the data delivery server. Since the user can be freed from cumbersomeness to input an alphanumeric character string such as the password by way of the video game device every time he tries to receive the delivery of the event information, the event information can be highly conveniently delivered.

In such a data delivery system, the user can be identified at the same time an input of the password is urged since the video game device receives the input of the password received from the data delivery server and saves the received password in the memory or the like. Thus, once the password is inputted, the user can be freed from cumbersomeness to input an alphanumeric character string such as the password every time he tries to receive the delivery of the event information. Further, if the password is not displayed by being saved in the memory or the like, it is useful to prevent uncertified use. Accordingly, the user can be identified at the same time the input of the password is urged at the time of user registration.

In such a data delivery system, the authentication information used to permit the delivery of the event information to the certified user is comprised of the recording medium specifying information (recording medium ID specifying the recording medium, etc.) stored in the recording medium and the identification information (e.g. IP address and the like of the video game device) peculiar to the video game device. Thus, by authentication based on these pieces of information, uncertified use can be prevented. Accordingly, since the authentication information used to permit the delivery of the event information to the certified user is comprised of the recording medium specifying information stored in the recording medium and the identification information peculiar to the video game device (IP address of the video game device, etc.), uncertified user can be prevented by authentication based on these pieces of information.

In such a data delivery system, the password generated to permit the delivery of the event information is temporarily provisionally registered, and regular registration as a certified user is made upon the receipt of this password as a response from the video game device to which the event information is to be delivered. Thus, regular user registration can be made after confirming the intention of the user to make a user registration. Accordingly, the password generated to permit the delivery of the event information is temporarily provisionally registered, and regular registration as a certified user is made upon the receipt of this password as a response from the video game device to which the event information is to be delivered. Thus, regular user registration can be made after confirming the intention of the user to make a user registration.

Furthermore, in such a data delivery system, the delivery condition concerning the delivery of the event information is administered while being related to the authentication information and, if the delivery condition from the video game device does not satisfy the delivery condition administered while being related to the authentication information, the delivery of the event information to this video game device is prohibited. Thus, the delivery of the event information can be administered based on the authentication information of each user. Here, the delivery condition is referred to when the event information is delivered to a terminal device and is, for example, a frequency of use (prepaid information) administered by being allotted beforehand to each recording medium. By setting a specified frequency of use as the delivery condition for each recording medium, the delivery of the event information corresponding to a purchased price can be provided. Thus, the deliverer at the data delivery server can administer the delivery of the event information based on the recording medium owned by the user. In the data delivery server, by storing and administering a delivered state of the event information as a delivery condition for each recording medium, the delivery of the event information corresponding to a delivered state to the video game device can be provided. As a result, the delivery condition concerning the delivery of the event information is administered while being related to the authentication information and the delivery of the event information is prohibited for the video game device not satisfying the delivery condition. Thus, the delivery of the event information can be administered based on the authentication information of each user. By setting a specified frequency of use as the delivery condition for each recording medium, the delivery of the event information corresponding to a purchased price can be provided.

Moreover, in such a data delivery system, the delivery condition including at least one of the data amount to be delivered, the number of data deliveries, the data delivery number and the validity term of the data delivery is administered while being related to the authentication information of each video game device. Thus, the deliverer at the data delivery server can provide the user with the delivery of the event information corresponding to the sold price of the recording medium. Further, the delivery service period and the like can be set for each recording medium in accordance with the data to be delivered. As a result, since the delivery condition including at least one of the data amount to be delivered, the number of data deliveries, the data delivery number, and the validity term of the data delivery is administered while being related to the authentication information of each video game device, the deliverer at the data delivery server can provide the user with the delivery of the event information corresponding to the sold price of the recording medium. Further, the delivery service period and the like can be set for each recording medium in accordance with the data to be delivered.

Yet, moreover, in such a data delivery system, the event content and the guide information concerning the event content are delivered as the event information to the video game device. Here, the event content represents a content to be delivered to the video game device and includes, e.g. a video music or the like. The guide information is comprised of various pieces of information relating to the event content and includes, e.g. a date of performance, a profile information of a performer, and a sale information of related goods in the case that the event content is a live relay broadcast of a performance at a studio or the like.

Since the guide information concerning the event content is provided in addition to the event content desired by the user, if the event content is, for example, a video music, related information can also be obtained. For instance, while receiving the delivery of a live relay broadcast at a studio as an event content, the user can receive the delivery of the date of the live relay broadcast, related goods information, and latest information of an artist as the guide information.

In addition, in such a data delivery system, the selection instruction to select at least one of the event content and the guide information may be received from the video game device, and at least one of the event content and the guide information corresponding to the selection instruction to the video game device may be delivered. Thus, the user can arbitrarily select the delivery of at least one of the event content and the guide information and the user can more conveniently use the data delivery system. As a result, since the selection instruction to select at least one of the event information and the guide information is received from the video game device and at least one of the event information and the guide information corresponding to the selection instruction is delivered to the video game device, the user can arbitrarily select the delivery of at least either one of the event content and the guide information and, therefore, can more conveniently use the data delivery system.

According to a data delivery server of the present invention, as mentioned in the above descriptions, at least the recording medium specifying information stored in the recording medium and read from the video game device is received from the video game device, the authentication information and the password used to permit the delivery of the event information are generated and administered based on the received recording medium specifying information while being related to the video game device. The authentication information and the password generated to deliver the event information in the data delivery server are transmitted to the video game device, and the event information is delivered to the video game device upon the receipt of the password as a response from the video device to which the authentication information and the password have been transmitted.

The data delivery server provides the delivery of the event information to the video game device by generating and administering the authentication information (e.g. user ID) and the password used to permit the delivery of the event information based on the recording medium specifying information while relating them to the video game device. Thus, the event information can be delivered after highly reliably authenticating the accessed user in response to the delivery request from the video game device. Further, the deliverer at the data delivery server side can provide the delivery of the event information corresponding to the recording medium since the data delivery server generates the authentication information (e.g. user ID) and the password used to permit the delivery of the event information based on the information specifying the recording medium (recording medium specifying information). Further, since the data delivery server delivers the event information upon receiving the password used to permit the delivery of the event information, which password was transmitted to the video game device in advance, from the video game device, the event information can be delivered based on the authentication information and the password administered at the data delivery server side. Accordingly, since the delivery of the event information to the video game device is provided by generating and administering the authentication information (e.g. user ID) and the password based on the information specifying the recording medium (recording medium specifying information) while relating them to the video game device to which the event information is to be delivered, the event information can be delivered after highly reliably authenticating the accessed user in response to the delivery request from the video game device. Further, since the authentication information (e.g. user ID) and the password used to permit the delivery of the event information are generated based on the information specifying the recording medium (recording medium specifying information) in the data delivery server, the deliverer at the data delivery server can deliver the event information corresponding to the recording medium. Furthermore, since the data delivery server delivers the event information upon receiving the password used to permit the delivery of the event information, which was transmitted beforehand to the video game device, from the video game device, the event information can be delivered based on the authentication information and the password administered in the data delivery server.

Specifically, the password received from the data delivery server may be saved in a memory or the like in such a video game device and, if the user tries to receive the delivery of the event information, the password is automatically read from the memory or the like and transmitted as a delivery request to the data delivery server. Thus, the user can be freed from cumbersomeness to input an alphanumeric character string such as the password every time he tries to receive the delivery of the event information.

This Patent Application is based on Japan Patent Application Serial No. 2001-174561, filed in Japan Patent Office on Jun. 8, 2001, the contents of which are hereby incorporated by reference.

As this invention may be embodied in several forms without departing from the spirit of essential characteristics thereof, the present embodiment is therefore illustrative and not restrictive, since the scope of the invention is defined by the appended claims rather than by the description preceding them, and all changes that fall within metes and bounds of the claims, or equivalence of such metes and bounds are therefore intended to embraced by the claims.

What is claimed is:

1. A data delivery system comprising:
a recording medium having recording medium specifying information stored and a program thereon;
a video game device having a main game unit executing the program stored in the recording medium detachably mountable in the main game unit by mounting the recording medium in the main game unit;
a data delivery server for delivering event information to the video game device when connected with each other via a network;
said data delivery server comprising:
user registration request receiving means for receiving at least a recording medium specifying information stored in the recording medium and video game identification information specific to the video game device in which the recording medium is mounted from the video game device,
authentication information administering means for administering authentication information including the recording medium specifying information and the video game identification information, and generating, in response to receipt of a request including said recording medium specifying information, both authentication information and a password used to permit the delivery of the event information to the video game device based on the received recording medium specifying information and said video game identification information, and for comparing a password received from the video game device with a registered password when the password is received as a delivery request from the video game device, said authentication information adminsitering means including:
  a provisional registering means for provisionally registering said generated password generated for comparison with a user-inputted password received over the network from said video game device; and
  a regular registering means for registering as a regularly registered password said provisionally registered password upon receipt of a user-inputted password received over the network from said video game device which is identical to said generated password;
  authentication information presenting means for transmitting the generated authentication information and the generated password to the video game device, and
  delivering means for delivering the event information to the video game device upon the receipt of a password as a response from the video game device when the password received matches the regularly registered password in a comparison by the authentication information administering means; and
said video game device comprising:
  input receiving means for receiving an input of content from the data delivery server via the network;
  user registration request transmitting means for reading the recording medium specifying information stored in the recording medium and said video game identification information and transmitting the same to the data delivery server;
  password storage means for receiving the authentication information and the generated password from the data delivery server and saving the generated password;
  password registering means for effecting registration of said generated password including:
    password receiving means for receiving said generated password from said data delivery server via the network;
    password display means for displaying said generated password to the user;
    password inputting means for accepting a password input by the user in response to a display of said generated password as said user-inputted password; and
    user-inputted password transmitting means for transmitting said user-inputted password to said data delivery server; and
  delivery request means for confirming the recording medium is mounted in the main unit, reading the generated password stored in the password storage means after confirming the recording medium is mounted in the main unit, and transmitting the generated password read to the data delivery server as a delivery request for the event information.

2. A data delivery system according to claim 1, wherein the authentication information administering means includes delivery condition administering means for administering a delivery condition associated with the authentication information and concerning the delivery of the event information, and the delivering condition administering means prohibits the delivery of the event information to the video game device if the delivery request from the video game device does not satisfy the delivery condition administered by the delivery condition administering means.

3. A data delivery system according to claim 2, wherein the delivery condition includes at least one of a data amount to be delivered, the number of data deliveries, a data delivery number, and a validity term of the data delivery.

4. The data delivery system according to claim 2, wherein the delivery condition is a frequency of use.

5. A data delivery system according to claim 1, wherein the event information includes an event content and guide information concerning the event content.

6. A data delivery system according to claim 5, wherein the data delivery server includes selection instruction receiving means for receiving a selection instruction for selecting at least one of the event content and the guide information from the video game device, and the delivering means delivers at least one of the event content and the guide information corresponding to the selection instruction to the video game device.

7. The data delivery system according to claim 1, wherein said recording medium and said password storage means are separate memory devices from one another.

8. A data delivery server for delivering an event information via a network to a video game device having a function of executing a program stored in a recording medium detachably mountable in a main game unit by mounting the recording medium in the main game unit, comprising:
  user registration request receiving means for receiving at least a recording medium specifying information stored in the recording medium and video game identification information specific to the video game device in which the recording medium is mounted from the video game device,
  authentication information administering means for administering authentication information including the recording medium specifying information and the video game identification information, and generating authentication information and a password, in response to receipt of a request including said recording medium specifying information, both used to permit the delivery of the event information to the video game device based on the received recording medium specifying information and said video game identification information, and for comparing a password received from the video game device with a registered password when the password is received as a delivery request from the video game device, said authentication information administering means including:
    a provisional registering means for provisionally registering said generated password generated for comparison with a user-inputted password received over the network from said video game device; and
    a regular registering means for registering as a regularly registered password said provisionally registered password upon receipt of a user-inputted password received over the network from said video game device which is identical to said generated password;
  authentication information presenting means for transmitting the generated authentication information and the generated password to the video game device, and
  delivering means for delivering the event information to the video game device upon the receipt of a password as a response from the video game device when the password received matches the generated password in a comparison by the authentication information administering means.

9. The data delivery server according to claim 8, wherein said recording medium and said password storage means are separate memory devices from one another.

10. The data delivery server according to claim 8, wherein:
the authentication information administering means includes delivery condition administering means for administering a delivery condition associated with the authentication information and concerning the delivery of the event information; and
the delivering condition administering means prohibits the delivery of the event information to the video game device if the delivery request from the video game device does not satisfy the delivery condition administered by the delivery condition administering means, wherein the delivery condition is a frequency of use.

11. A video game device having a function of executing a program stored in a recording medium detachably mountable in a main game unit by mounting the recording medium in the main game unit and adapted to receive event information from a data delivery server for delivering the event information via a network, comprising:
input receiving means for receiving an input of content from the data delivery server via the network;
user registration request transmitting means for reading the recording medium specifying information stored in the recording medium and video game identification information specific to the video game in which the recording medium is mounted and transmitting the same to the data delivery server;
authentication information receiving means for receiving authentication information and a password generated to permit the delivery of the event information based on the recording medium specifying information in the data delivery server from the data delivery server;
password storage means for saving the generated password;
password registering means for effecting registration of said generated password including:
password receiving means for receiving said generated password from said data delivery server via the network;
password display means for displaying said generated password to the user;
password inputting means for accepting a password input by the user in response to a display of said generated password as said user-inputted password; and
user-inputted password transmitting means for transmitting said user-inputted password to said data delivery server; and
delivery request transmitting means for confirming the recording medium is mounted in the main unit, reading the generated password stored in the password storage means after confirming the recording medium is mounted in the main unit, and transmitting the generated password read to the data delivery server as a delivery request for the event information.

12. The video game device according to claim 11, wherein said recording medium and said password storage means are separate memory devices from one another.

* * * * *